A. L. LIEBEL & L. BARKER.
SECURITY MILK CAN.
APPLICATION FILED SEPT. 26, 1912.
1,069,963.
Patented Aug. 12, 1913.
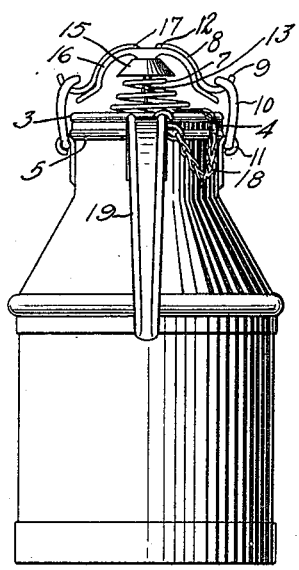
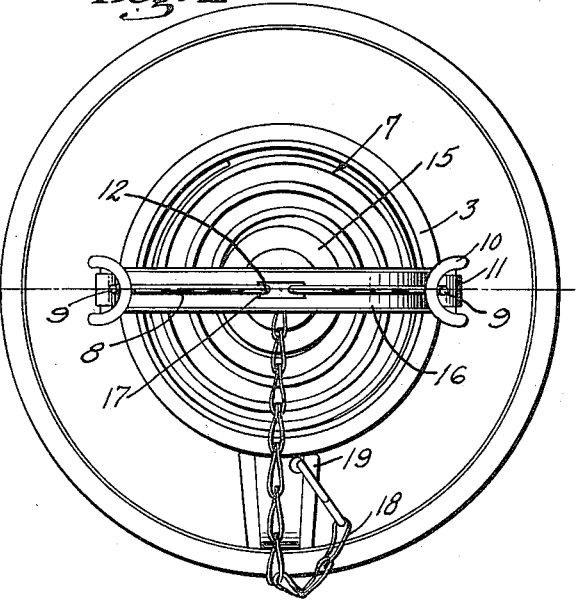
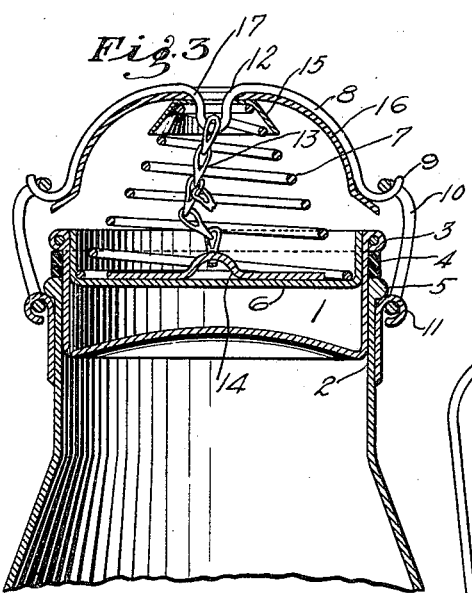
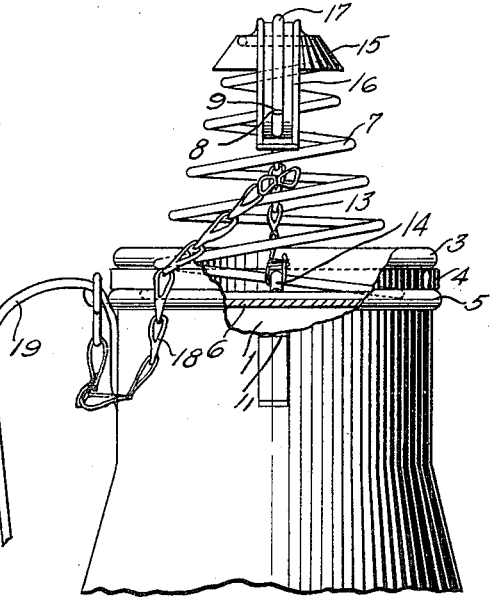
Witnesses:—
Thor Sjoberg
L. Belle Price
Inventors:—
Albert L. Liebel & Lee Barker
by James R. Townsend
their atty

UNITED STATES PATENT OFFICE.

ALBERT L. LIEBEL AND LEE BARKER, OF LOS ANGELES, CALIFORNIA; SAID BARKER ASSIGNOR TO SAID LIEBEL.

SECURITY MILK-CAN.

1,069,963.     Specification of Letters Patent.     Patented Aug. 12, 1913.

Application filed September 26, 1912. Serial No. 722,540.

*To all whom it may concern:*

Be it known that we, ALBERT L. LIEBEL and LEE BARKER, both citizens of the United States, residing at Los Angeles, in the county of Los Angeles and State of California, have invented a new and useful Security Milk-Can, of which the following is a specification.

The object of this invention is to provide a milk can which can be handled with great freedom by milkmen and shippers without any liability of spilling the milk, loosening the can cover or leakage in case the can is upset and to do so by simple, cheap, easily constructed means that will allow the can to be quickly opened and shut.

The invention may be embodied in various ways and will be illustrated here in the form at present deemed most desirable.

The accompanying drawings illustrate the invention.

Figure 1 is an elevation of the milk can closed. Fig. 2 is an enlarged plan of the milk can shown in Fig. 1. Fig. 3 is a broken sectional elevation on line $x^3$, Fig. 2. Fig. 4 is a broken elevation from the right of Figs. 1 and 3.

The closure 1 for the can is preferably cylindrical throughout the portion thereof that is intended to enter the mouth 2 of the can and fits in said mouth. It is provided at its upper end with a bead 3 below which is applied the gasket 4 of any suitable material to fit on the beaded rim 5 of the mouth of the can, so that when the closure 1 is inserted into the mouth 2 and forced down upon the gasket there will be practically no leakage.

The closure is provided with a spring-support 6 that is fixed thereto by any suitable means and is shown in the drawing as a cap inserted into and soldered in the hollow cylindrical closure 1; and upon the spring support is seated spring closure-holding means in the form of a spiral spring 7 upon the top of which is mounted a bail 8 extending beyond the bead 3 and provided at its ends with hooks 9 to receive the links 10 that are hinged by ears 11 which are fastened to the middle of the can and engage the under-side of the beaded rim 5. Said bail 8 is provided intermediate its ends with a depending loop 12 to which is attached a stay 13 in the form of a chain suspended from the loop 12 and connected to the closure 1 by any suitable means as the loop 14 fixed to the support 6 and centrally located below the depending loop 12.

The length of the chain is sufficient to allow the spring to force the bail 8 upward to hold the hooks 9 tightly in the links 10 when the hooks are inserted in the links and the bail is left otherwise free. A spring shield 15 incloses the top of the conical spring 7 and protects the same from displacement; and a reinforcing strip of sheet metal or other suitable material 16 conforming to the under-side of the bail and provided with a central slot 17 to receive a depending loop 12 of the bail is provided to support and to give increased strength to the bail to resist the action of the spring 7.

An extension of the chain 13 may be provided as at 18 and fastened to the handle 19 of the can, thus to prevent loss of the closure when it is removed from the mouth of the can.

In practice, when it is desired to close the can, the closure is simply applied as a stopper in the mouth of the can and the bail 8 is then forced down to compress the spring 7 sufficiently to allow the links 10 to be caught onto the hook 9 whereupon such pressure is released from the bail and the spring being held in compression by the links holds the links firmly hooked until pressure is again applied to lower the hooks and allow the links to be withdrawn from the hooks.

The chain 13 restrains the spring and the spring and chain together hold the bail in a practical rigid relation with the closure so as to form a convenient handle therefor.

The spring means 7 preferably consists of a conical spiral spring so that its upper end is non-obtrusive.

The closure and the mouth are preferably cylindrical as shown so that the closure will not wedge in the can but may be withdrawn without any difficulty when the links are released from the hooks and so that the closure may be forced down to compress the gasket as far as may be necessary to prevent leaking under all ordinary conditions even though the can is overturned.

We claim:—

1. In a milk can a closure, a bail, a spring between the closure and bail, and means connecting the bail with the can when the closure is in closing position, said bail being detachable from the connecting means.

2. The combination with a can of a closure for the mouth of the can, spring means on the closure, and means connected with the can and acting upon said spring means to hold the closure in closing position, said closure holding means being detachable from the can.

3. A can, a closure for the mouth of the can, a spring mounted on the closure, a bail on the spring connection between the bail and the closure to restrain the spring, and means connecting the bail with the can to compress the spring and hold the closure in the mouth of the can, said bail being detached when the connecting means are disengaged.

4. The combination with a can of a closure for the mouth of the can, a conical spring mounted on the closure, a bail provided with a centrally depending loop and with end hooks, a chain connecting the loop with the closure, a spring between the bail and the closure to hold the bail away from the closure and links connected to the can and engaging the hooks.

5. In a can a closure provided with a spring support, a conical spiral spring mounted on the spring support, a shield on the top of the spring, a bail provided with a central loop extending through the slot and with hooks at its ends, a slotted reinforcing strip on the underside of the bail, the loop of the bail extending through the slot of the strip, a spring to force the bail away from the closure, a connection connecting the loop with the closure, and means carried by the can to engage the hooks of the bail.

6. A can provided with a cylindrical mouth, a cylindrical closure to fit said mouth, said closure being provided with a bead, a gasket on the cylindrical closure to contact with the rim of the can, a spring acting upon the closure, fastening means carried by the spring, and means carried by the can to engage said fastening means.

7. A hollow closure, a conical spiral spring mounted on the closure, a shield on the top of said spring, a bail having a depending loop extending down into the shield and a connection between the loop and the closure, and means for connecting the can and the bail.

In testimony whereof, we have hereunto set our hands at Los Angeles, California, this 20th day of September, 1912.

ALBERT L. LIEBEL.
LEE BARKER.

In presence of—
JAMES R. TOWNSEND,
L. BELLE RICE.

Copies of this patent may be obtained for five cents each, by addressing the "Commissioner of Patents, Washington, D. C."